G. LEYER & J. A. WINTER.
Apparatus for Producing Bromine from Bitterns, &c.
No. 137,222.  Patented March 25, 1873.
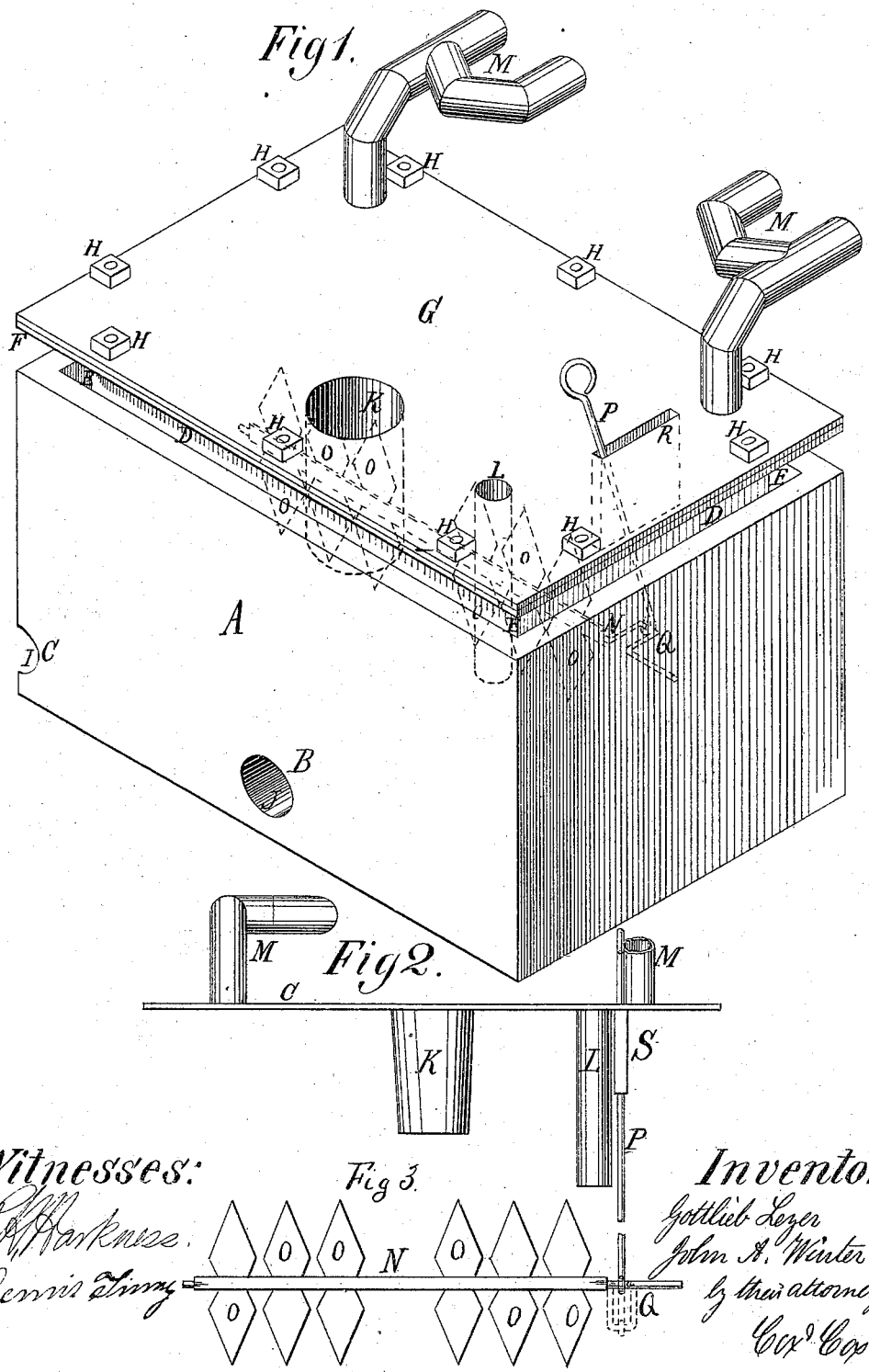

UNITED STATES PATENT OFFICE.

GOTTLIEB LEYER AND JOHN A. WINTER, OF POMEROY, OHIO.

IMPROVEMENT IN APPARATUS FOR PRODUCING BROMINE FROM BITTERNS, &c.

Specification forming part of Letters Patent No. 137,222, dated March 25, 1873.

*To all whom it may concern:*

Be it known that we, GOTTLIEB LEYER and JOHN A. WINTER, all of Pomeroy, Ohio, have invented certain new and useful Improvements in Apparatus for Producing Bromine, of which the following is a specification, reference being had to the accompanying drawing.

Nature and Objects of the Invention.

This invention relates to an improvement in apparatus for producing bromine from bitter water; and consists of a retort, rectangular in form, incased within a wooden box so as to leave a small space to be filled with sand between the outside of the retort and the inside of the box, and provided with pipes for charging the retort, subjecting its contents to the action of steam, connecting it with the coolers, and for withdrawing the exhausted bittern from it; provided, also, with a revolving stirrer for rapidly and thoroughly mixing the ingredients with which the retort is charged, the several parts being so constructed as to produce as nearly as possible an air-tight retort.

Description of the Drawing.

Figure 1 is a perspective view of a device embodying the elements of the invention. Fig. 2 is a side elevation of the top or cover C. Fig. 3 is a view of the stirrer N.

In the accompanying drawing, a wooden box, A, provided with orifices B and C, incases a rectangular retort, D, a space, E, being left between the box A and retort D to be filled with sand. The retort D is preferably composed of iron lined with porcelain; but any other suitable material may be substituted. The top of the retort D is surrounded with a flange, F, to which the cover G is secured, by screw-bolts H, in such a manner as to make an air-tight seam. Pipes I and J lead from the interior of the retort to the outside of the box A. A steam-pipe is fitted to the pipe I. The pipe J is used to withdraw the exhausted bittern from the retort. A funnel, K, secured to the cover G, extends some distance into the retort, and is used for charging the retort with the bitter matter. A small tube, L, secured to the cover G, extends still further into the retort, and is used to charge the retort with the material for eliminating the bromine used in the process. M M are sections of the leaden pipe of which the cooler is composed. A revolving stirrer, N, provided with arms O, has its bearings in the ends of the retort, and is operated by a pitman, P, attached to a double crank, Q, made in the shaft of the stirrer N. The pitman P passes through a sheathed orifice, R, in the cover G. The sheath S extends a short distance within the retort.

Operation.

The retort is charged with the bitter water through the funnel K until the contents rise in the funnel K, tube I, and sheath S. The material for eliminating the bromine is introduced through the small tube L, since, if this be poured in at the funnel K, which is necessarily large in order to expedite the operation of charging, it will cause the contents of the retort to boil over, and a much greater waste will occur than if the small tube L be used. Steam is introduced through the pipe I, and the contents of the retort subjected to its action a sufficient length of time. By the aid of the revolving stirrer N the ingredients are rapidly and thoroughly mixed, thereby greatly expediting the manufacture of bromine. By opening the discharge-pipe J the exhausted bittern may be readily removed.

The sand packing which surrounds the retort D thickens the walls, which causes the retention of the heat within the retort.

Claims.

Having thus described our invention, what we claim as new and useful, and desire to secure by Letters Patent, is—

1. The retort D, provided with the small tube I and the sheathed orifice R S, in combination with the revolving stirrer N O, operated by the pitman P, substantially as and for the purposes hereinbefore set forth.

2. In combination, the box A, having orifices B C, the retort D provided with pipes I J M, funnel K, tube I, and sheathed orifice R S, and the revolving stirrer N O, arranged relatively one to the other as and for the purposes hereinbefore set forth.

In testimony that we claim the foregoing improvement in apparatus for producing bromine as above described, we have hereunto set our hands and seals this 31st day of January, 1873.

GOTTLIEB LEYER. [L. S.]
    JOHN ANDREW WINTER. [L. S.]

Witnesses:
    HENRY STAHL,
    GEORGE KEPLER.